(12) United States Patent
Goel

(10) Patent No.: US 10,516,593 B2
(45) Date of Patent: Dec. 24, 2019

(54) METHOD AND NETWORK MONITORING DEVICE FOR CALCULATING THROUGHPUT OF TRAFFIC FLOWS IN COMMUNICATION NETWORKS

(71) Applicant: CELLOS SOFTWARE LTD, Melbourne (AU)

(72) Inventor: Amit Goel, Gurgaon Haryana (IN)

(73) Assignee: Amit Goel, Haryana (IN)

(*) Notice: Subject to any disclaimer, the term of this patent is extended or adjusted under 35 U.S.C. 154(b) by 269 days.

(21) Appl. No.: 15/045,505

(22) Filed: Feb. 17, 2016

(65) Prior Publication Data
US 2017/0237642 A1    Aug. 17, 2017

(51) Int. Cl.
*H04L 12/26* (2006.01)
(52) U.S. Cl.
CPC ................. *H04L 43/0888* (2013.01)
(58) Field of Classification Search
None
See application file for complete search history.

(56) References Cited

U.S. PATENT DOCUMENTS

| | | | |
|---|---|---|---|
| 7,477,602 B2 | 1/2009 | Ling | |
| 8,719,398 B2 | 5/2014 | Qian | |
| 9,007,953 B1* | 4/2015 | Broyles | H04L 41/082 370/253 |
| 2004/0240447 A1* | 12/2004 | Dorbolo | H04L 12/2856 370/392 |
| 2005/0220035 A1* | 10/2005 | Ling | H04L 41/147 370/252 |
| 2006/0218264 A1* | 9/2006 | Ogawa | H04L 47/10 709/223 |
| 2007/0147244 A1* | 6/2007 | Rasanen | H04L 47/10 370/231 |
| 2011/0270972 A1* | 11/2011 | Mukherjee | H04L 41/0833 709/224 |
| 2014/0341109 A1* | 11/2014 | Cartmell | H04L 45/308 370/328 |
| 2016/0165484 A1* | 6/2016 | Cui | H04W 28/08 370/235 |
| 2016/0359750 A1* | 12/2016 | Miklos | H04L 47/24 |

OTHER PUBLICATIONS

TCP IP Packet taken from https://devcentral.f5.com/articles/application-is-more-than-header-deep Nov. 2, 2012 (Year: 2012).*

* cited by examiner

*Primary Examiner* — Jeffrey M Rutkowski
*Assistant Examiner* — Basil Ma
(74) *Attorney, Agent, or Firm* — Shumaker, Loop & Kendrick, LLP

(57) ABSTRACT

The present invention relates to a network monitoring device and methods for calculating average throughput of subscribers in a communication network.

21 Claims, 10 Drawing Sheets

METHOD AND NETWORK MONITORING DEVICE FOR CALCULATING THROUGHPUT OF TRAFFIC FLOWS IN COMMUNICATION NETWORKS

FIELD

The present invention relates to a network monitoring device and methods for calculating average throughput of subscribers in a communication network.

BACKGROUND

Currently, solution providers have proposed deploying network monitoring devices to sniff packets on traffic flows in communication networks and perform analysis based on sniffed packets. In existing proposals, the network monitoring device (NPM) usually has the following functions: (1) receiving packets from directional traffic flows through linking to high-speed transmission links in a data network; (2) performing statistical data calculations on received packets of traffic flows; and (3) reporting calculated statistical data to an external processing device or system, such as a customer experience management (CEM) system. However, there are significant shortcomings associated with these proposals as explained below.

Whilst it is proposed that the NPM sniff and analyse packets in order to acquire statistical data relating to user traffic, communication and data network operators are interested in knowing how end users (customers) of their networks perceive throughputs (download throughput and/or upload throughput). For example, communication and data network operators are eager to determine a mean throughput in uplink/downlink of an end user (customer), where the mean uplink throughput may be determined to be a number of bits/bytes transferred over a preconfigured report period divided by the preconfigured report period.

However, current methods for determining mean throughput values suffer from inaccuracies in that the methods do not correct for packets arriving in bursts, nor IP packets transferred solely for maintaining the session between the end users' device and internet servers.

Different approaches have been proposed to address the inaccuracies. One such approach involves calculating the number of bytes transferred in the downlink/uplink direction during a confined period and then disregarding the lowest 20%-30% values. An alternative approach disregards the highest 10% values. However, both approaches may fail to reflect congestion in the network such that the network operator is unable to quickly learn of any network congestion by looking at the estimated throughput of users.

In this context, there is a need for a method which is able to accurately calculate the estimated throughput of a subscriber in a communication network.

SUMMARY

According to an exemplary embodiment of the present disclosure there is provided a method for calculating throughput of a subscriber in a data network, comprising:

monitoring, by a network monitoring device, two or more traffic flows corresponding to the subscriber over a predetermined monitoring period;

calculating, by the network monitoring device, a total number of bits in each of the two or more traffic flows over the predetermined monitoring period;

calculating, by the network monitoring device, an average throughput of each of the two or more traffic flows over the predetermined monitoring period; and calculating, by the network monitoring device, a weighted average of the average throughput of each of the two or more traffic flows based on the total number of bits in each of the two or more traffic flows, wherein the weighted average provides an estimated throughput of the subscriber in the data network over the predetermined monitoring period.

A weight of the average throughput of one of the two or more traffic flows may be proportional to the calculated total number of bits of the traffic flow over the predetermined monitoring period.

The two or more traffic flows may comprise at least one uplink traffic flow.

The two or more traffic flows may comprise at least one downlink traffic flow.

Calculating a total number of bits in each of the two or more traffic flows may comprise calculating the total number of bits in application protocol data units carried by each of the two or more traffic flows.

Calculating an average throughput of each of the two or more traffic flows may comprise calculating the average throughput of application protocol data units carried by each of the two or more traffic flows.

Calculating a weighted average of the average throughput of each of the two or more traffic flows based on the total number of bits in each of the two or more traffic flows may comprise:

summing, by the network monitoring device, the calculated total number of bits in each of the two or more traffic flows over the predetermined monitoring period to generate an aggregate number of bits corresponding to the subscriber;

multiplying, by the network monitoring device, the average throughput of each of the two or more traffic flows over the predetermined monitoring period with a corresponding total number of bits in the traffic flow to generate two or more bit throughput products corresponding to the two or more traffic flows;

summing, by the network monitoring device, the two or more bit throughput products to generate an aggregate bit throughput product; and dividing, by the network monitoring device, the aggregate bit throughput product by the aggregate number of bits so as to generate an estimated throughput of the subscriber in the data network.

The method may further comprise outputting, by the network monitoring device, the estimated throughput of the subscriber over the predetermined monitoring period to an external data analysis processing device.

According to another exemplary embodiment of the present invention there is also provided a method for calculating throughput of a subscriber in a data network, comprising:

monitoring, by a network monitoring device, two or more traffic flows corresponding to the subscriber over a predetermined monitoring period;

calculating, by the network monitoring device, a total number of bits in each of the two or more traffic flows over the predetermined monitoring period so as to generate $A\_i$, wherein an index i is a positive integer;

calculating, by the network monitoring device, an average throughput of each of the two or more traffic flows over the predetermined monitoring period to be $B\_i$;

calculating, by a network monitoring device, an aggregate number of bits corresponding to the subscriber according to expression (1):

$$\text{aggregate number of bits} = \Sigma_{i=1}^{n} A\_i \qquad \text{expression (1),}$$

wherein the parameter n is the number of traffic flows corresponding to the subscriber over the predetermined monitoring period;

calculating, by a network monitoring device, an aggregate bit throughput product corresponding to the subscriber according to expression (2):

$$\text{aggregate bit throughput product} = \Sigma_{i=1}^{n} A\_i \times B\_i \quad \text{expression (2); and}$$

calculating, by a network monitoring device, an estimated throughput of the subscriber over the predetermined monitoring period according to expression (3):

$$\text{estimated throughput} = \frac{\sum_{i=1}^{n} A\_i * B\_i}{\sum_{i=1}^{n} A\_i}. \quad \text{Expression (3)}$$

The two or more traffic flows may comprise at least one uplink traffic flow.

The two or more traffic flows may comprise at least one downlink traffic flow.

According to another exemplary embodiment of the present invention there is also provided a network monitoring device for calculating throughput of a subscriber in a data network comprising:

a datagram monitor, configured to:
monitor two or more traffic flows corresponding to the subscriber over a predetermined monitoring period; and a metrics calculator, connected to the datagram monitor and configured to:
calculate a total number of bits in each of the two or more traffic flows over the predetermined monitoring period;
calculate an average throughput of each of the two or more traffic flows over the predetermined monitoring period; and
calculate a weighted average of the average throughput of each of the two or more traffic flows based on the total number of bits in each of the two or more traffic flows, wherein the weighted average provides an estimated throughput of the subscriber in the data network over the predetermined monitoring period.

A weight of the average throughput of one of the two or more traffic flows may be proportional to the calculated total number of bits of the traffic flow over the predetermined monitoring period.

The two or more traffic flows may comprise at least one uplink traffic flow.

The two or more traffic flows may comprise at least one downlink traffic flow.

The metrics calculator may be further configured to:
calculate the weighted average of the average throughput of each of the two or more traffic flows based on the total number of bits in each of the two or more traffic flows comprises:
sum, by the network monitoring device, the calculated total number of bits in each of the two or more traffic flows over the predetermined monitoring period to generate an aggregate number of bits corresponding to the subscriber;
multiply, by the network monitoring device, the average throughput of each of the two or more traffic flows over the predetermined monitoring period with a corresponding total number of bits in the traffic flow to generate two or more bit throughput products corresponding to the two or more traffic flows;
sum, by the network monitoring device, the two or more bit throughput products to generate an aggregate bit throughput product; and
divide, by the network monitoring device, the aggregate bit throughput product by the aggregate number of bits so as to generate an estimated throughput of the subscriber in the data network.

The network monitoring device may further comprise:
a metrics output connected to the metrics calculator and configured to output the estimated throughput of the subscriber over the predetermined monitoring period to an external data analysis processing device.

According to another exemplary embodiment of the present invention there is also provided a network monitoring device for calculating throughput of a subscriber in a data network, comprising:

a datagram monitor, configured to:
monitor two or more traffic flows corresponding to the subscriber over a predetermined monitoring period; and a metrics calculator, connected to the datagram monitor and configured to:
calculate a total number of bits in each of the two or more traffic flows over the predetermined monitoring period so as to generate A_i, wherein an index i is a positive integer;
calculate an average throughput of each of the two or more traffic flows over the predetermined monitoring period to be B_i;
calculate an aggregate number of bits corresponding to the subscriber according to Expression (1):

$$\text{aggregate number of bits} = \Sigma_{i=1}^{n} A\_i \quad \text{Expression (1),}$$

wherein the parameter n is the number of traffic flows corresponding to the subscriber over the predetermined monitoring period;

calculate an aggregate bit throughput product corresponding to the subscriber according to Expression (2):

$$\text{aggregate bit throughput product} = \Sigma_{i=1}^{n} A\_i \times B\_i \quad \text{Expression (2); and}$$

calculate an estimated throughput of the subscriber over the predetermined monitoring period according to Expression (3):

$$\text{estimated throughput} = \frac{\sum_{i=1}^{n} A\_i * B\_i}{\sum_{i=1}^{n} A\_i}. \quad \text{Expression (3)}$$

The network monitoring device may further comprise:
a metrics output connected to the metrics calculator and configured to output the estimated throughput of the subscriber in the data network over the predetermined monitoring period to an external data analysis processing device.

BRIEF DESCRIPTION OF DRAWINGS

Embodiments of the invention will now be described by way of example only with reference to the accompanying drawings, in which.

DETAILED DESCRIPTIONS OF EXEMPLARY EMBODIMENTS

Figure 1:
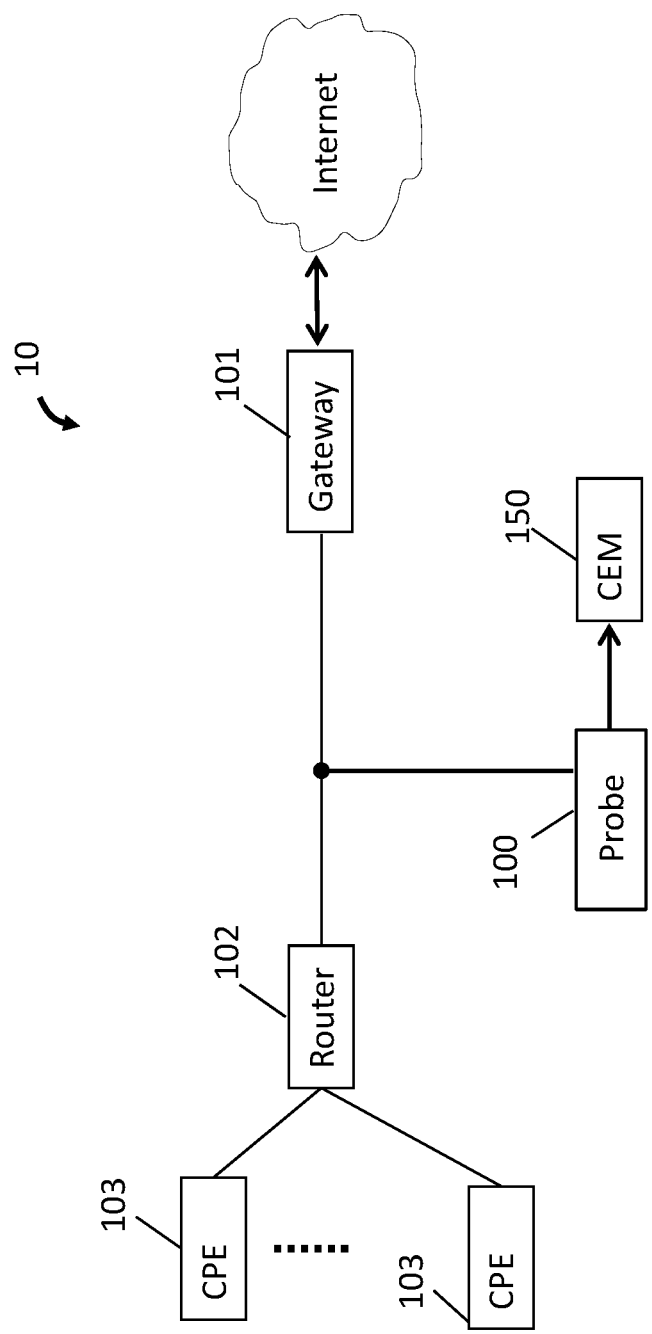
FIG. 1 illustrates architecture of an exemplary data network 10 according to an embodiment of the present invention.

In the following description, numerous specific details are set forth in order to provide a thorough understanding of various illustrative embodiments of the invention. However, it will be understood by those skilled in the art that embodiments of the invention may be practiced without some or all of these specific details. In other instances, well known process operations have not been described in detail in order to not unnecessarily obscure pertinent aspects of embodiments being described. In the drawings, like reference numerals refer to same or similar functionalities or features throughout the several views.

In order to address the problems and challenges faced by communication and data network operators in determining subscriber perspective or user-perspective throughput, the present disclosure provides a network monitoring device and related methods/approaches to estimate user-perceived throughput in the communication network or the data network by calculating a weighted average of the measured average throughput of traffic flows corresponding to the same subscriber over a preconfigured monitoring period.

FIG. 1 illustrates architecture of an exemplary data network 10 according to an embodiment of the present invention. Referring to FIG. 1, a network monitoring device 100 (or a multi-protocol probe, hereafter referred to as probe 100) connects to a link between a gateway 101 and an internal router 102, the latter further connecting to a plurality of customer premise equipments (CPEs) 103 in the data network 10. For the simplicity of illustration, only two CPEs 103 are shown in FIG. 1, and there may be multiple devices connecting to the data network 10 through corresponding CPEs 103. Each CPE 103 is assigned at least one IP address. For small businesses and home businesses, a single IP address, whether static or dynamic, may be assigned to each CPE 103. For large businesses, each CPE 103 may further connect to a cloud that contains a plurality of servers so that each CPE 103 may be assigned a range of IP addresses, which may be referred to as aggregated IP addresses. In the present disclosure, the CPE represents a subscriber in the network 10.

The probe 100 transparently receives packets from a plurality of traffic flows directly associated with each CPE 103. It is noted that the probe 100 passively extracts copies of packets from traffic flows in the data network 10, transparently processes the received packets and does not affect the transmission thereof. Probe 100 is further configured to generate statistical reports based on the received packets and send the generated reports to a customer experience management (CEM) system 150 external to the probe 100. In another embodiment CEM 150 can be replaced by an alternative data analysis processing device.

Figure 2:
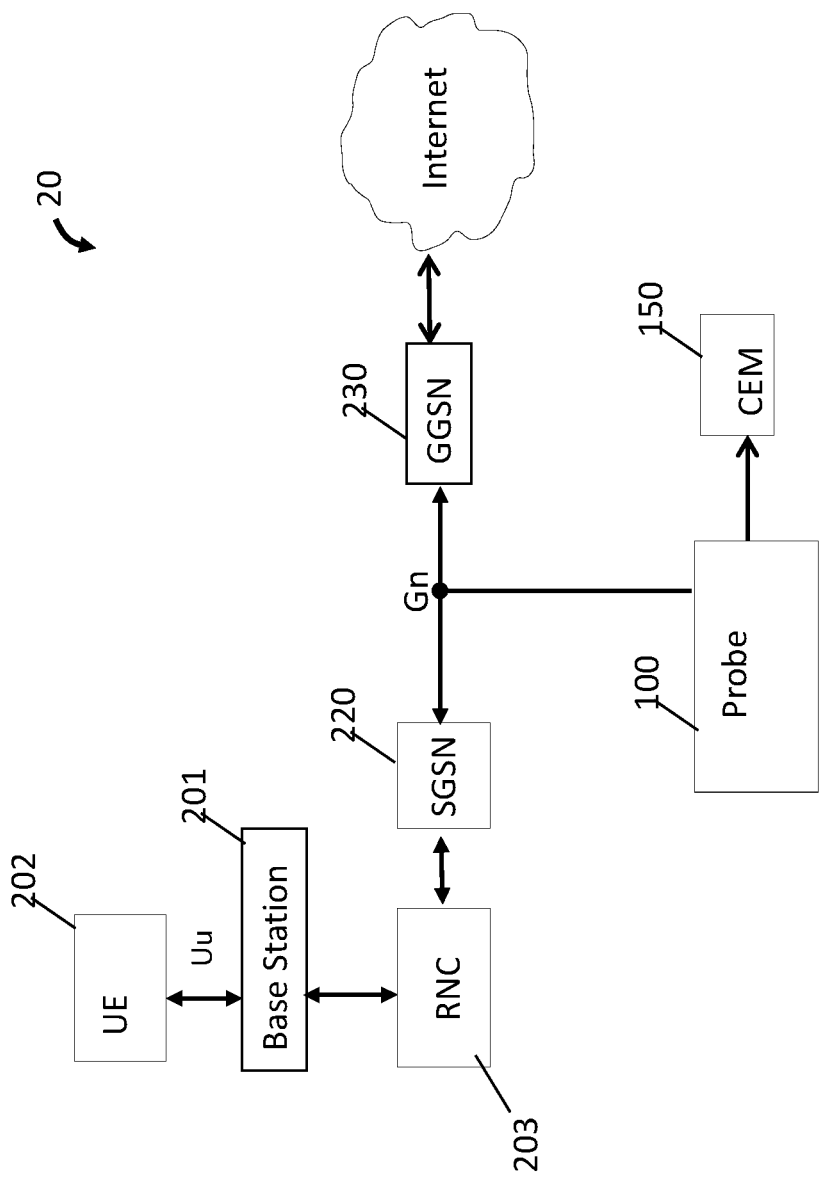
FIG. 2 illustrates architecture of an exemplary communication network 20 according to an embodiment of the present invention.
Figure 3:
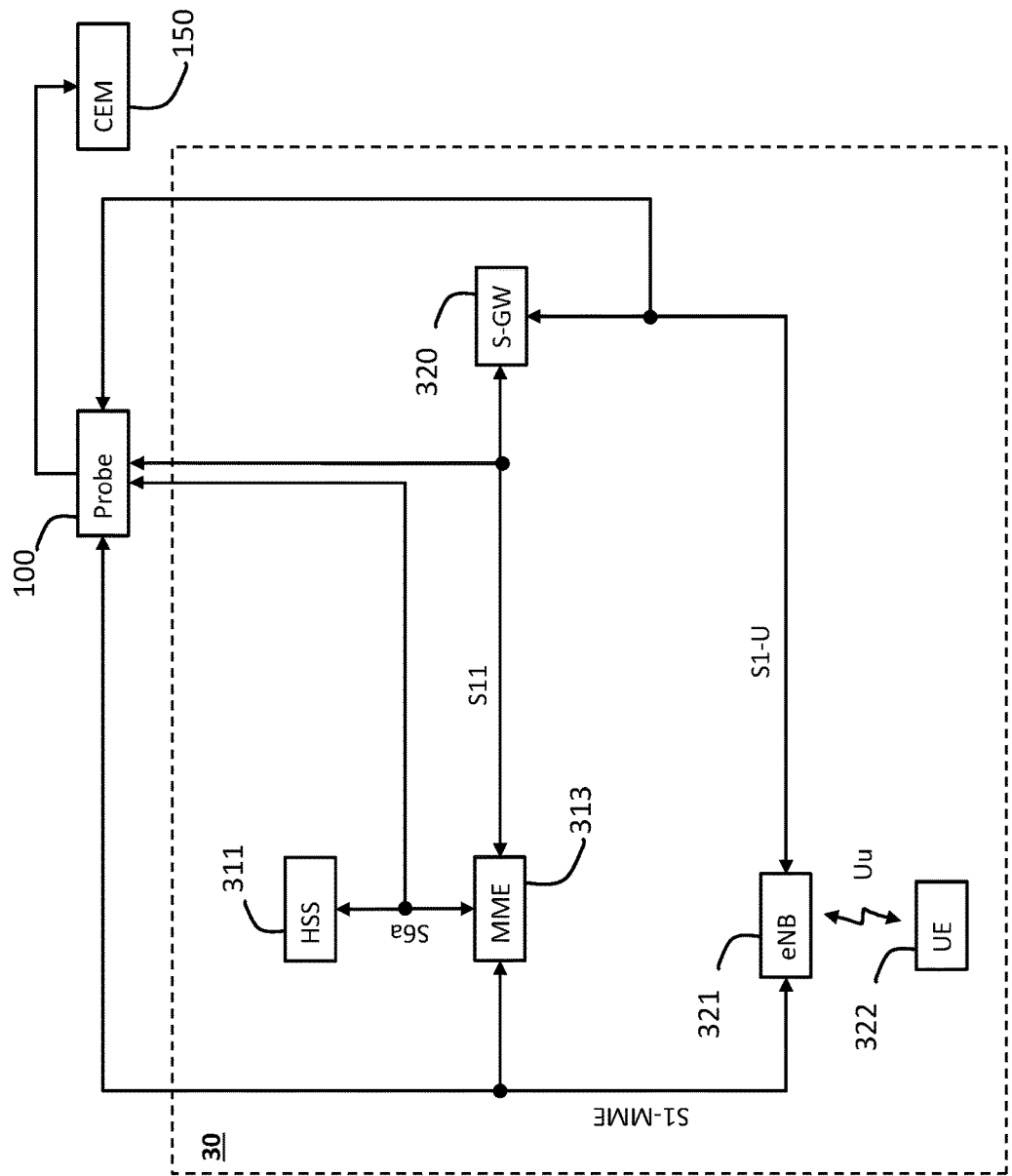
FIG. 3 illustrates architecture of an exemplary communication network 30 according to an embodiment of the present invention.

The invention may be applied to any data network using different communication protocol standards, e.g. Long Term Evolution (LTE) network, 3G network as defined in Third Generation Partnership Project (3GPP) Technical Specifications Releases 4-9. In different data networks, the probe 100 may be deployed to sniff packets from high speed link over different interfaces. For example, in 3G network, the probe 100 may be deployed to sniff packets from high speed link over Gn interface as shown in FIG. 2. For another example, in the LTE network as shown in FIG. 3, the probe 100 may sniff traffic flows from LTE interfaces, for instance, LTE S1-U, S4, S11 and S12 interfaces over high speed links. Additionally, the probe 100 may be configured to sniff messages/signalling containers from control plane interfaces of LTE network.

FIG. 2 illustrates architecture of an exemplary communication network 20 according to an embodiment of the present invention. Referring to FIG. 2, in a 3G network, probe 100 may connect to a link between Serving GPRS Support Node (SGSN) 220 and Gateway GPRS Support Node (GGSN) 230 to extract traffic flows. The traffic flows originate from, or transmit to, a user equipment (UE) 202 which is connected with the SGSN 220 via a radio network controller (RNC) 203 and a base station 201. The UE 202 is connected to the base station 201 through an air interface Uu. UE 202 receives packets from, and transmits packets to, the Internet via the GGSN 230. As shown in FIG. 2, the probe 100 may extract directional traffic flows from the Control-plane (C-Plane) and the User-Plane (U-Plane) via the Gn interface in the communication network 20, and then generate statistical reports based on packets received from the directional traffic flows and send the generated reports to a CEM150 external to the probe 100. In the present disclosure, the UE or the user device represents the subscriber.

FIG. 3 illustrates architecture of an exemplary communication network 30 according to an embodiment of the present invention. Referring to FIG. 3, the probe 100 is configured to extract traffic flows from both the U-Plane and the C-Plane. The U-Plane traffic flows relate to Internet Protocol (IP) packets transported between the mobile devices/UE 322 through the evolved NodeB (eNB) 321 and any servers in Cloud/Internet. Usually, the IP packets travel through high speed links between mobile devices/UEs and Cloud/Internet via Serving Gateway (S-GW)/Service General Packet Radio Service Support Node (SGSN) 320. The C-Plane traffic flows are related to control information such as those transported between eNB 321 and Mobility Management Entity (MME) 313 for customers. As shown in FIG. 3, probe 100 may connect to a S1-U interface between eNB 321 and S-GW/SGSN 320 to extract directional traffic flows from the U-Plane, and connect to a S1-MME between eNB 321 and MME 313 to extract directional traffic flows from the C-Plane. In some embodiments, probe 100 is connected to extract traffic flows from C-Plane via other C-Plane interfaces, such as an S6a interface between Home Subscriber Server (HSS) 311 and MME 313.

Prior to describing the operation of the probe 100, the basic unit of statistical data collection, i.e. the traffic flow in probe 100 is explained. In the present disclosure, three types of traffic flows are described when describing operations of the probe 100. The concept of traffic flows is important to an understanding of the U-Plane processing. Firstly, a directional Traffic Flow in Transmission Control Protocol/Internet Protocol (TCP/IP) networks is defined as: "a flow is a series of packets that share the same source and destination IP addresses, source and destination ports, and IP protocol. This is also called a five-tuple IP flow." The five-tuple may include: a source IP address; a source port number; a destination IP address; a destination port number; and an IP protocol.

Both source and destination addresses must be of the same type, i.e. IPv4 or IPv6 and the flow is directional. If the source and destination are swapped, it becomes a different flow. The IP protocol member specifies the Layer 4 protocol, e.g. TCP, UDP. In the present disclosure, the flow is also called a directional traffic flow.

In 3G/LTE networks, on U-Plane, the directional traffic flow may be characterised by five-tuple and TEID due to IP encapsulation used in tunneling of directional traffic flows. Directional traffic flows transmitted in different directions are assigned different TEIDs. For example, in 3G/LTE networks, the TEID is 32 bits long.

In order to reliably detect application layer protocols, the probe 100 may use deep packet inspection (DPI engine) analyse traffic flows in both directions together. That is, probe 100 analyses bi-directional traffic flows. In the present disclosure, analysis of traffic flows together in both directions is referred to as a "bi-directional traffic flow". A bi-directional traffic flow groups the two directional traffic flows corresponding to opposite directions together. That is to say, the source of one directional traffic flow corresponds to the destination of the other directional traffic flow in the opposite direction. The bi-directional traffic flow is specified by a five-tuple similar to the directional traffic flow, which may include: a lower IP address; a lower port number; an upper IP address; an upper port number; and a Layer 4 protocol.

In a bi-directional traffic flow, instead of a source and a destination address, the five-tuple includes a lower and an upper address. "Lower" refers to a numerically smaller value and "upper" refers to a numerically greater value. Lower port number refers to the port associated with the lower IP address and not the numerically lower port number.

For example, suppose the source address is 192.168.1.17 port 2192 and the destination is 11.20.5.34 port 80, the lower IP address and port are 11.20.5.34 port 80 and the upper IP address and port are 192.168.1.17 port 2192. If the source is 11.20.5.34 port 80 and the destination is 192.168.1.17 port 2192 then the lower IP and port are still 11.20.5.34 port 80 and the upper IP address and port are still 192.168.1.17 port 2192. The five-tuple is the same regardless of the source and destination. Therefore the direction of data transfer cannot be identified from the bi-directional traffic flow five-tuple. The meaning of the Layer 4 protocol field is the same as that of the IP protocol in the directional traffic flow five-tuple.

The real IP traffic traversing in the communication network and data network is related to application traffic flow(s) of end users/subscribers. The application traffic flow is a concept used in the statistical reports generated by the probe 100 and sent to, for example, the CEM 150 or an external data analysis processing device for further processing and analysis. An application traffic flow is specified by a three-tuple, which may include: an internal IP address; an external IP address; and an application ID (Identifier). The internal IP address is the IP address of the UE or the mobile phone and is internal to the operator's network. The external address is external to the operator's network, most likely in the Internet. The application ID corresponds to the Layer 7 or application layer protocol, e.g. HTTP, IMAP, and so forth. This three-tuple is bi-directional similar to the five-tuple of a bi-directional flow. It is also similar in that the application ID generally identifies the destination port and the IP protocol, except when a server is using an unconventional port number for that application/protocol. Essentially, an application traffic flow is the aggregation of possibly multiple bi-directional traffic flows. For example, suppose a UE is connected to a website and has multiple pages open, there will be multiple bi-directional flows each with a different source port in the HTTP between that UE and the web server. In the present disclosure, an application traffic flow may refer to traffic flows from one UE with the same application protocol, or all traffic flows to a specific destination/application server belonging to a particular application protocol.

In order to calculate statistical data of an active traffic flow(s), such as throughput of a particular subscriber on U-Plane, the probe 100 receives IP packets from directional traffic flows on both C-Plane and U-Plane, generates statistical data for bi-directional traffic flows and then uses the generated statistical data and other related identification information extracted from the bi-directional traffic flows to calculate the statistical data of a particular application traffic flow/particular directional traffic flow on U-Plane. Probe 100 may further use the identifier information obtained from C-Plane such as Fully Qualified Tunnel End Identifier (FTEID), International Mobile Subscriber Identity (IMSI) or Globally Unique Temporary ID (GUTI) to correlate statistic data of a particular application traffic flow/particular directional traffic flow with a subscriber in the data network. After the probe 100 calculates the statistical data of traffic flows corresponding to a large number of customers/subscribers, the calculated statistic data are output or transferred from the probe 100 to the CEM 150 as shown in FIGS. 1-4.

Figure 4:
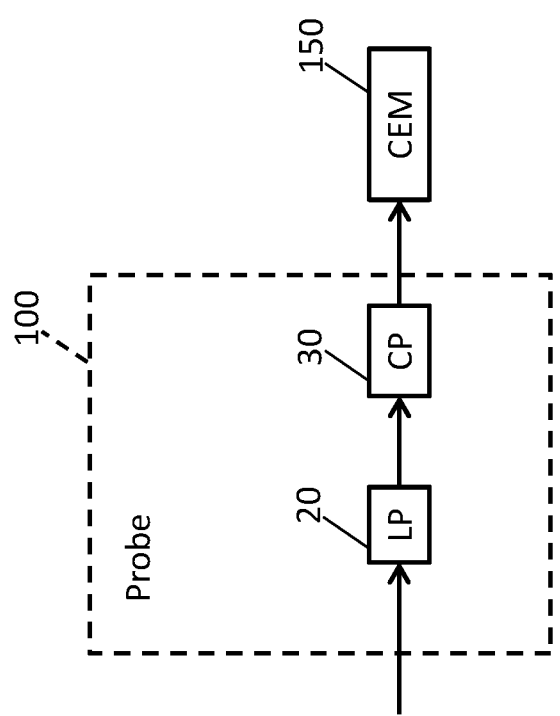
FIG. 4 shows major processing elements in a probe 100 according to an embodiment of the present invention.

FIG. 4 shows major processing elements in a probe 100 according to an embodiment of the present invention. The process of statistical calculation in probe 100 may be explained with reference to FIG. 4. As shown in FIG. 4, the probe 100 may include a link processor (LP) 20 connected to a correlation processor (CP) 30. In another embodiment, the probe 100 may include more than one LP 20 connected to the CP 30. When a plurality of LPs 20 are used to process incoming traffic flows, the LPs work in parallel to extract directional traffic flows, and apply detection on IP packets on each directional traffic flow.

In order to calculate statistical data of all directional traffic flows or application traffic flows from one UE belonging to a particular application protocol, e.g. HTTP, FTP etc, probe 100 may use the DPI engine operating in the LP 20 to obtain application layer protocol of the received packets in bi-directional traffic flows. The application layer protocol has unique Application ID in the three-tuple definition of the application traffic flow.

Before each request-response message/packet for any application traffic flow occurs on U-Plane, there may be at least one or some control signalling or control messages transferred on C-Plane, and the LP 20 of the probe 100 may extract customer/subscriber information thereon, such as FTEID, IMSI, GUTI, eNB-UE-S1APID, MME-UE-S1APID and so forth. Thus, the CP 30 receiving output from LPs 20 will further correlate the application traffic flows with the customer/subscriber information in the control signalling or control messages. Subsequently, the CP generates a traffic flow statistic data report regarding individual customer/subscriber and transmits the report to the CEM 150 or an external data processing analysis device.

According to an embodiment of the invention, each LP 20 in the probe 100 reports statistical data of a bi-directional traffic flow in a preconfigured data structure to the CP 30. Each data structure is a nested structure and may include at least the following pre-configured information, such as: an upper IP address; a lower IP address; an upper port number; a lower port number; an Application ID; a downlink statistic data structure; and an uplink statistic data structure.

The Downlink statistical data structure for one bi-directional traffic flow includes at least the following information, such as: "Number of bytes" received from the downlink traffic flow; "Number of packets" received from the downlink traffic flow; "Active Second Vector" for current report period, which is configured to record the active seconds of downlink traffic flow within the current reporting period; "Period Octet Vector" for current report period, which is configured to accumulate and store statistical data of the downlink traffic flow within the current reporting period, e.g. the number of bytes and the number of packets transferred in the downlink traffic flow; FTEID of the directional traffic flow. In 3G/LTE networks, FTEID includes TEID and Layer 3 IP address of GTP packets. This Layer 3 IP address is only for routing encapsulated IP packet inside the LTE network.

The Uplink statistical data structure for the same bi-directional traffic flow includes at least the following information: "Number of bytes" received from the uplink traffic flow; "Number of packets" received from the uplink traffic flow; "Active Second Vector" for current report period, which is configured to record the active seconds of uplink traffic flow within the current reporting period; "Period Octet Vector" for current report period, which is configured to accumulate and store statistic data of the uplink traffic flow within the current reporting period, e.g. the number of bytes and the number of packets transferred in the uplink traffic flow; FTEID of the directional traffic flow.

Figure 5:
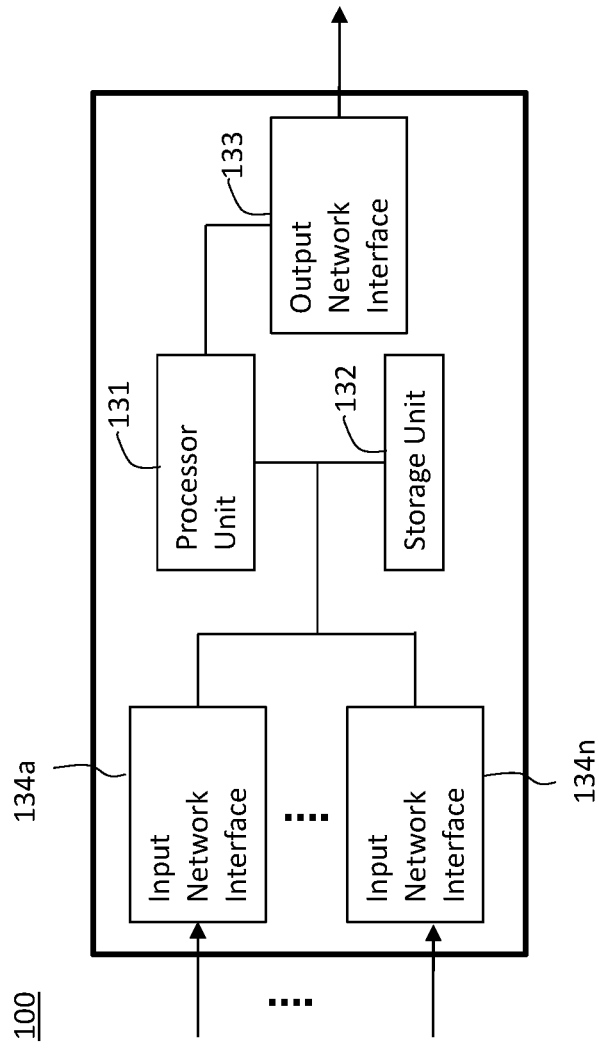
FIG. 5 is a schematic diagram of physical components of the monitoring probe 100.

FIG. 5 is a schematic diagram of the physical components of probe 100. Probe 100 includes a processor unit 131, a storage unit 132, an output network interface 133, and one or more input network interfaces 134*a* . . . 134*n*. It is envisaged that probe 100 will typically include more than one input network interface 134. However, those skilled in the art will appreciate that the probe 100 may include only one input network interface 134. For example, in an embodiment of probe 100 configured to only monitor for control plane messages transmitted from eNB 121 to MME 113 on the S1-MME interface, the probe 100 may have only one input network interface 134.

Each of the input network interfaces 134*a* . . . 134*n* is connected to a respective one of the eNB 321, MME 313, HSS 311 and S-GW 320 on a high-speed link. The processor unit 131 is configured to implement (or execute) a number of software modules based on program code and/or data stored in the storage unit 132. The storage unit 132 stores program code for implementing software modules for identifying a user plane identifier of the UE 202/UE 322 and also correlate the control plane identifier and the user plane identifier of the UE 202/UE 322.

Figure 6:
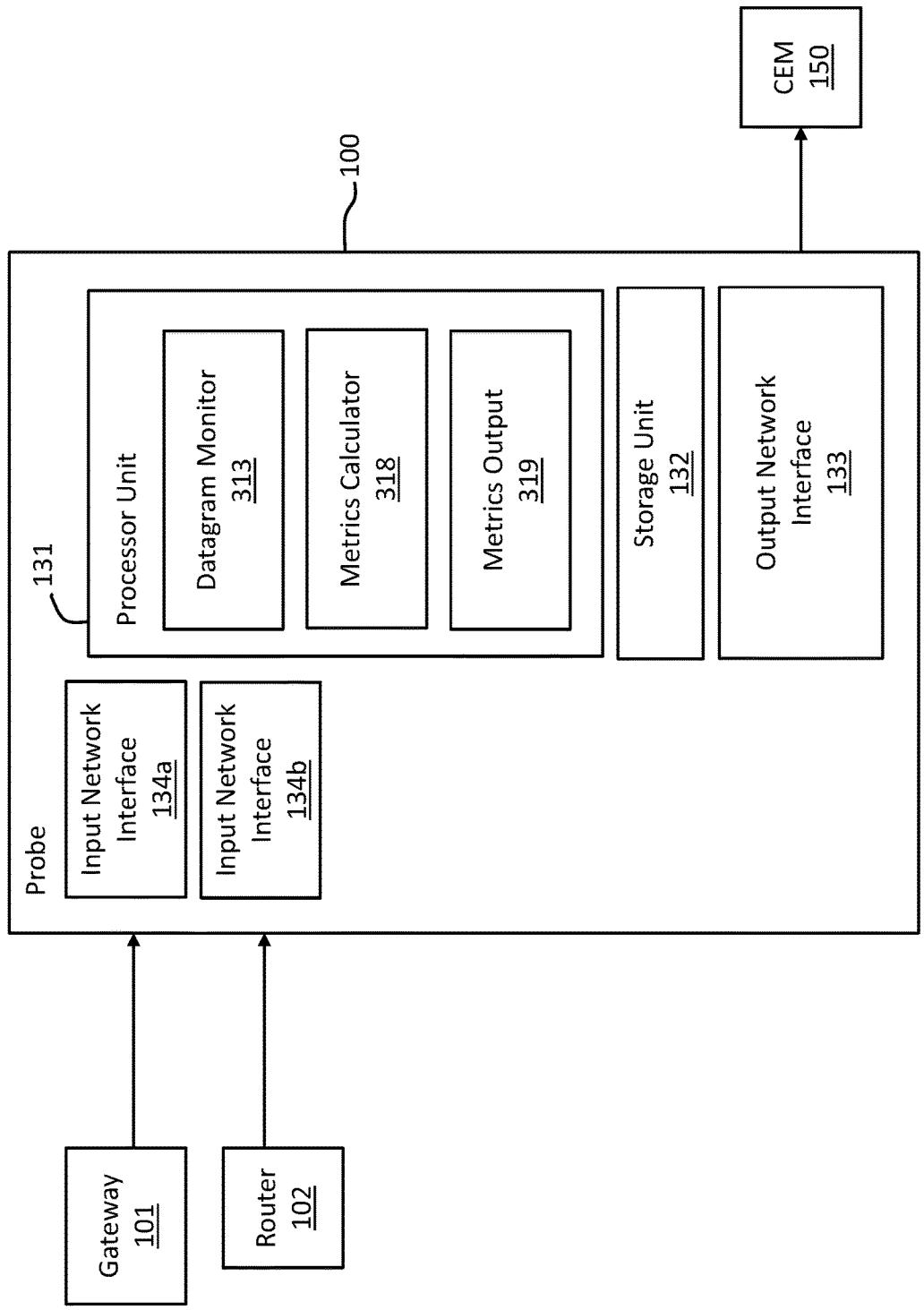
FIG. 6 is a schematic diagram of the functional components of the network monitoring device 100 for calculating throughput of one of CPEs 103 in the data network 10.

FIG. 6 is a schematic diagram of the functional components of probe 100 for calculating throughput of one of CPEs 103 in the data network 10. In this embodiment, the functional components are software modules implemented by the processor unit 131 of probe 100. However, those skilled in the art will appreciate that one or more of the functional components could alternatively be implemented in some other way, for example, by one or more dedicated circuits.

One of the software modules implemented by the processor unit 131 is a datagram monitor 313. The datagram monitor 313 is adapted to monitor one or more of the network devices of the data network 10 for receipt of at least one control plane message and/or user plane data packet. For example, the datagram monitor 313 may be part of the LP 20. Each of the control plane messages/user plane data packets comprises at least one control plane identifier. At least one of the control plane messages/user plane data packets comprises at least one user device identifier, and at least another one of the control plane messages comprises at least one user plane identifier.

Referring to FIG. 6, the processor unit 131 is electrically connected to at least one Input Network Interfaces 134*a*, 134*b*. In some embodiments, the processor unit 131 is electrically connected to Input Network Interfaces 134*a* and 134*b*. Also, the processor unit 131 is connected to the storage unit 132 and the output network interface 133. The datagram monitor 313 monitors a gateway 101 and a router 102 for receipt of control plane messages or user plane data packets. Other software modules implemented by the processor unit 131 are a metrics calculator 318 and a metrics output 319. The metrics calculator 318 analyses the IP packets received on traffic flows corresponding to each subscriber in the data network 10, calculates throughput of each subscriber over preconfigured monitoring period, and then outputs the calculated throughput of each subscriber through the metrics output 319 (via the output network interface 133) to CEM 150 or another data analysis processing device. For example, the metrics calculator 318 and a metrics output 319 may be part of the LP 30.

Figure 7:
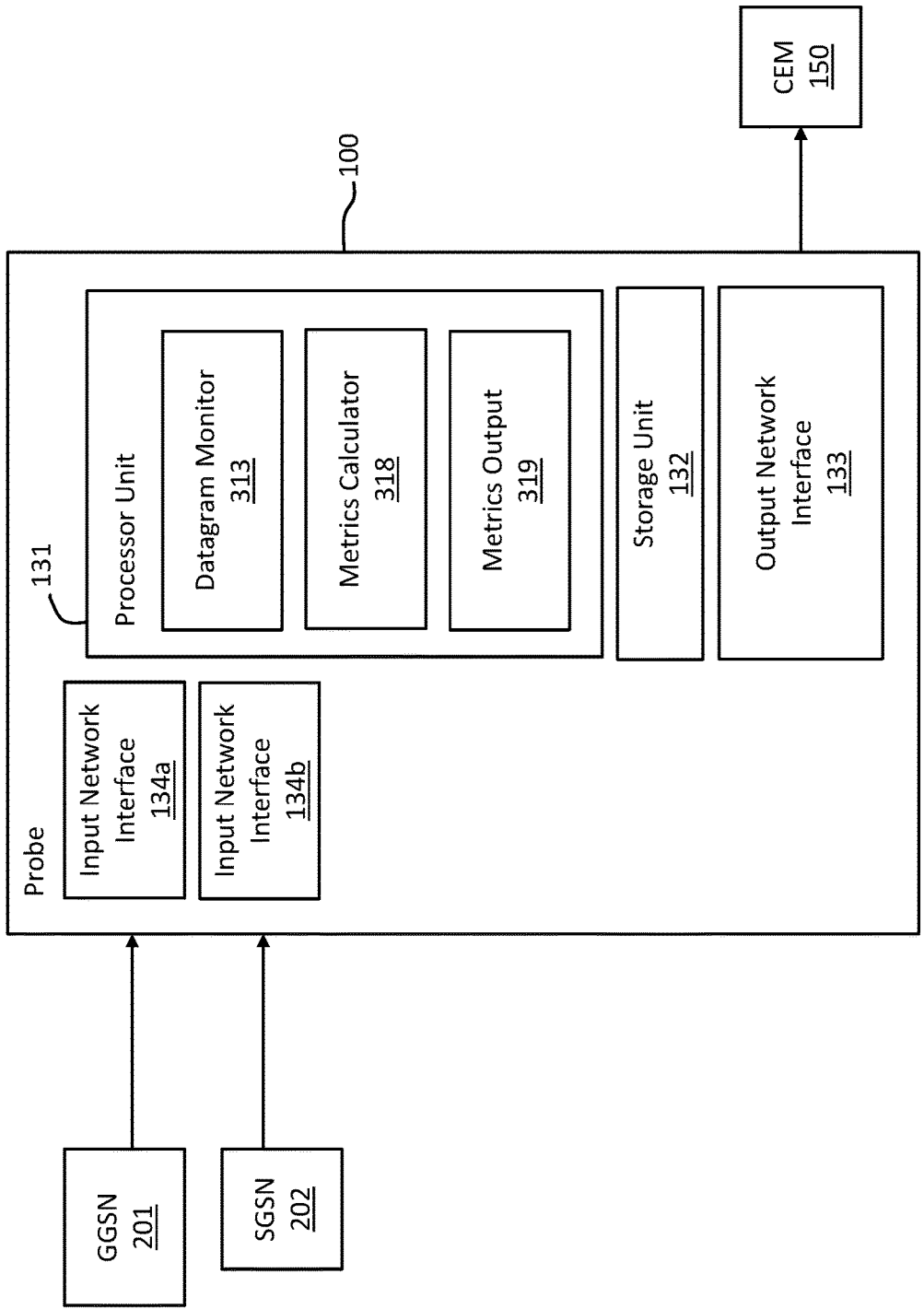
FIG. 7 is a schematic diagram of the functional components of the monitoring probe 100 for calculating throughput of a user device in the communication network 20.

FIG. 7 is a schematic diagram of the functional components of the monitoring probe 100 for calculating throughput of a user device in the communication network 20. In this embodiment, the functional components are software modules implemented by the processor unit 131 of the monitoring probe 13. However, persons skilled in the art will appreciate that one or more of the functional components could alternatively be implemented in some other way, for example, by one or more dedicated electronic circuits.

The datagram monitor 313 is adapted to monitor one or more of the network devices of the communication network 20 for receipt of at least control plane messages and/or user plane data packets. Each of the control plane messages/user plane data packets comprises at least one control plane identifier. At least one of the control plane messages/user plane data packets comprises at least one user device identifier, and at least another one of the control plane messages comprises at least one user plane identifier. For example, the datagram monitor 313 may be part of the LP 20.

Referring to FIG. 7, the processor unit 131 is electrically connected to at least one Input Network Interfaces 134*a* and 134*b*. In some embodiments, processor unit 131 is electrically connected to Input Network Interfaces 134*a* and 134*b*. Also, the processor unit 131 is connected to the storage unit 132 and the output network interface 133. Datagram monitor 313 monitors the GGSN 201 and the SGSN 202 for receipt of control plane messages or user plane data packets. Metrics calculator 318 analyses the IP packets received on traffic flows corresponding to each subscriber in the communication network 20, calculates throughput of each subscriber over a preconfigured monitoring period, and then outputs the calculated throughput of each subscriber through metrics output 319 (via output network interface 133) to CEM 150, or another data analysis processing device. For example, metrics calculator 318 and a metrics output 319 may be part of the LP 30.

Figure 8:
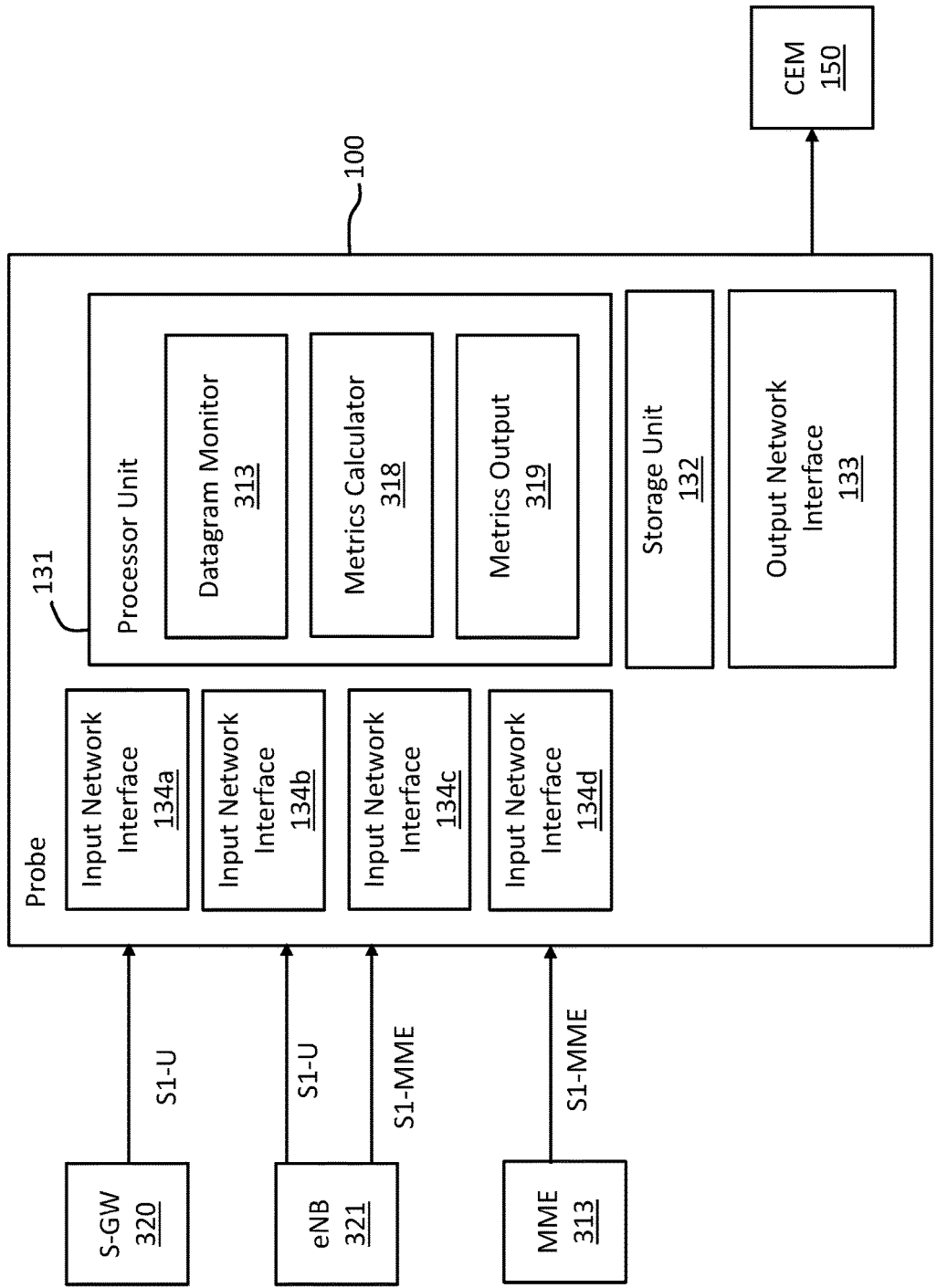
FIG. 8 is a schematic diagram of the functional components of the monitoring probe 100 for calculating throughput of a user device in the communication network 30.

FIG. 8 is a schematic diagram of the functional components of the monitoring probe 100 for calculating throughput of a user device in the communication network 30. In this embodiment, the functional components are software modules implemented by the processor unit 131 of the monitoring probe 13. However, persons skilled in the art will appreciate that one or more of the functional components could alternatively be implemented in some other way, for example, by one or more dedicated circuits.

The datagram monitor 313 is adapted to monitor one or more of the network devices of the communication network 30 for receipt of at least control plane messages and/or user plane data packets. Each of the control plane messages/user plane data packets comprises at least one control plane identifier. At least one of the control plane messages/user plane data packets comprises at least one user device identifier, and at least another one of the control plane messages comprises at least one user plane identifier. For example, the datagram monitor 313 may be part of the LP 20.

Referring to FIG. 8, the processor unit 131 is electrically connected to at least one Input Network Interfaces 134a, 134b, 134c, 134d in order to monitor control plane messages or user plane data packets coming from S-GW 320, eNB 321 and MME 313 via Input Network Interfaces 134a, 134b, 134c, 134d respectively. In some embodiments, processor unit 131 is connected to Input Network Interfaces 134a-134b for monitoring user plane data packets coming from S-GW 320 and eNB 321. Also, processor unit 131 is connected to storage unit 132 and output network interface 133. Datagram monitor 313 monitors eNB 321 and MME 313 for receipt of control plane messages or user plane data packets. Metrics calculator 318 analyses the IP packets received on traffic flows corresponding to each subscriber in communication network 30, calculates throughput of each subscriber over a preconfigured monitoring period, and then outputs the calculated throughput of each subscriber through metrics output 319 (via output network interface 133) to CEM 150 or another data analysis processing device. For example, metrics calculator 318 and metrics output 319 may be part of the LP 30.

Figure 9:
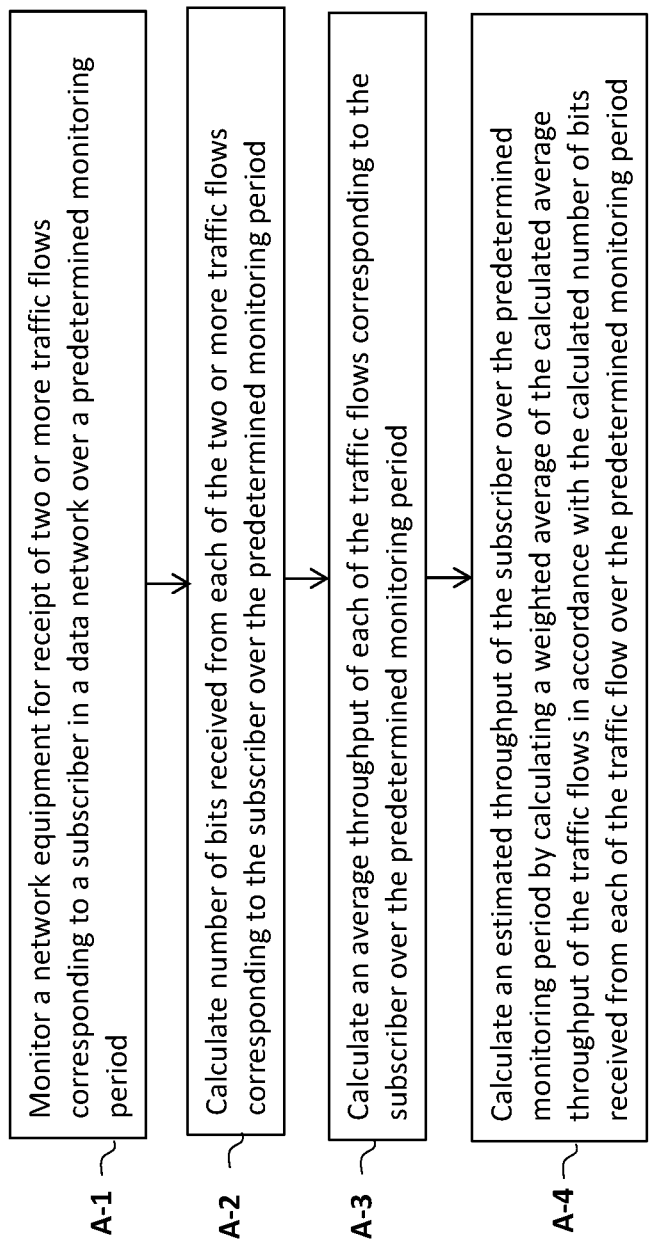
FIG. 9 is flowchart illustrating a method for calculating throughput of a subscriber in a communication network or data network according to a first exemplary embodiment.

FIG. 9 is flowchart illustrating a method for calculating throughput of a subscriber in a communication network or data network according to a first exemplary embodiment. Referring to FIG. 6 to FIG. 9, the method for calculating throughput of a subscriber in the network may include the following steps A-1 to A-4, and can be applied to any of communication networks 10, 20 or 30.

In step A-1, the datagram monitor 313 of the probe 100 is configured to monitor a network equipment, such as a UE, in the data network for two or more traffic flows corresponding to the subscriber in the data network over a predetermined monitoring period via the input network interface 134a and/or 134b. For example, the predetermined monitoring period may be 1 minute. The data network here can refer to any of communication networks 10, 20 or 30.

In step A-2, the metrics calculator 318 of the probe 100 is configured to receive data packets of the two or more traffic flows from the datagram monitor 313 and calculate a total number of bits received from each of the two or more traffic flows corresponding to the subscriber in the data network over the predetermined monitoring period. At the step A-2, a weight of the calculated average throughput of one of the two or more traffic flows is proportional to the calculated total number of bits of the traffic flow over the predetermined monitoring period. For example, the predetermined monitoring period may be 5 minutes.

In step A-3, the metrics calculator 318 is further configured to calculate an average throughput of each of the two or more traffic flows corresponding to the subscriber in the data network over the predetermined monitoring period. The two or more traffic flows may include at least one uplink traffic flow, or at least one downlink traffic flow. In another embodiment, the two or more traffic flows comprise both downlink traffic flow(s) and uplink traffic flow(s), and thus the metrics calculator 318 is configured to calculate an average throughput in both uplink and downlink directions.

In step A-4, the metrics calculator 318 is further configured to calculate an estimated throughput of the subscriber over the predetermined monitoring period by calculating a weighted average of the calculated average throughput of each of the two or more traffic flows in accordance with the calculated total number of bits received from each of the two or more traffic flows over the predetermined monitoring period.

In an embodiment altered from the first exemplary embodiment, at the step A-4, the metrics output 319 of the probe 100 is further configured to output the estimated throughput of the subscriber over the predetermined monitoring period to an external data analysis processing device or the CEM 150.

At the step A-2, in the step of calculating the total number of bits received from each of the two or more traffic flows corresponding to the subscriber in the data network over the predetermined monitoring period, the metrics calculator 318 may be further configured to calculate the total number of bits received from application protocol data units carried by each of the two or more traffic flows corresponding to the subscriber in the data network.

At the step A-3, in the step of calculating the average throughput of each of the two or more traffic flows corresponding to the subscriber in the data network over the predetermined monitoring period, the metrics calculator 318 is further configured to calculate the average throughput of the application protocol data units over the predetermined monitoring period carried by each of the two or more traffic flows corresponding to the subscriber in the data network.

At the step A-4, in the step of calculating the estimated throughput of the subscriber over the predetermined monitoring period by calculating a weighted average of the calculated average throughput of each of the two or more traffic flows in accordance with the calculated total number of bits received from each of the two or more traffic flows over the predetermined monitoring period, the metrics calculator 318 is further configured to:

add up the calculated total number of bits received from each of the two or more traffic flows over the predetermined monitoring period to generate an aggregate number of bits received corresponding to the subscriber;

multiply the average throughput of each of the two or more traffic flows corresponding to the subscriber in the data network over the predetermined monitoring period respectively with a corresponding total number of bits received from the traffic flow to generate at least one bit throughput product respectively corresponding to the two or more traffic flows corresponding to the subscriber in the data network;

add up the at least one bit throughput product respectively corresponding to the two or more traffic flows corresponding to the subscriber in the data network to generate an aggregate bit throughput product corresponding to the subscriber in the data network; and divide the aggregate bit throughput product by the aggregate number of bits received corresponding to the subscriber to generate the estimated throughput of the subscriber over the predetermined monitoring period.

Figure 10:
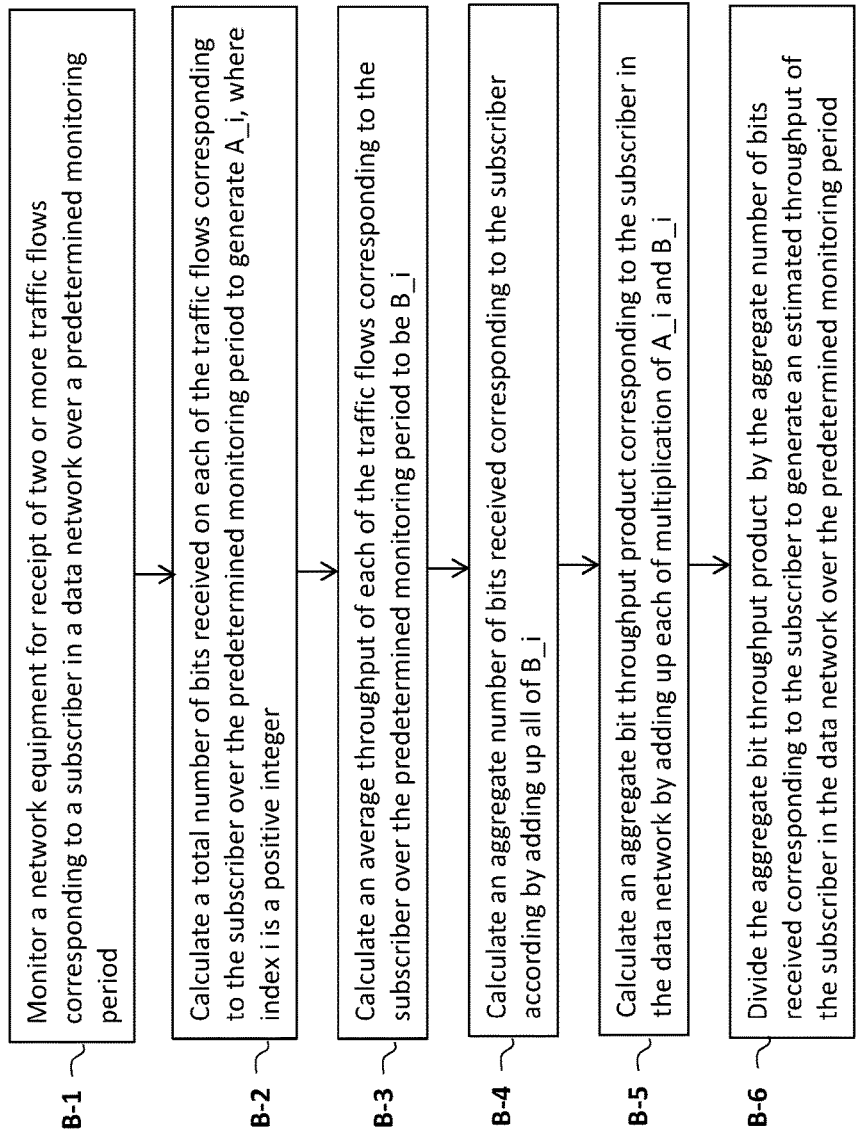
FIG. 10 is flowchart illustrating a method for calculating throughput of a subscriber in a communication network or data network according to a second exemplary embodiment.

FIG. 10 is flowchart illustrating a method for calculating throughput of a subscriber in a communication network or data network according to a second exemplary embodiment. Referring to FIGS. 6 to 8 and 10, the method for calculating throughput of a subscriber in the network may include following steps B-1 to B-6, and can be applied to any of communication networks 10, 20 or 30.

In step B-1, the datagram monitor 313 of the probe 100 is configured to monitor a network equipment in the data network for receipt of two or more traffic flows corresponding to the subscriber in the data network over a predetermined monitoring period via the input network interface 134a and/or 134b. For example, the predetermined monitoring period may be 5 minutes.

In step B-2, the metrics calculator 318 is configured to calculate a total number of bits received on each of the two or more traffic flows corresponding to the subscriber over the predetermined monitoring period to generate $A\_i$, where an index i is a positive integer, and the metric $A\_i$ is a total number of bits received on a traffic flow i out of the two of more traffic flows corresponding to the subscriber over the predetermined monitoring period.

In the step B-3, the metrics calculator 318 is further configured to calculate an average throughput of each of the two or more traffic flows corresponding to the subscriber over the predetermined monitoring period to be $B\_i$, where the metric $B\_i$ is an average throughput of a traffic flow i out of the two of more traffic flows corresponding to the subscriber over the predetermined monitoring period.

In the step B-4, the metrics calculator 318 is further configured to calculate an aggregate number of bits received corresponding to the subscriber by adding up all of the metrics $A\_i$ according to an expression (1):

$$\text{aggregate number of bits received} = \sum_{i=1}^{n} A\_i \quad \text{Expression (1)},$$

where the parameter n in the Expression (1) is the number of traffic flows corresponding to the subscriber in the data network received over the predetermined monitoring period.

In the step B-5, the metrics calculator 318 is further configured to calculate an aggregate bit throughput product corresponding to the subscriber in the data network by adding up each of multiplication of $A\_i$ and $B\_i$ according to an Expression (2):

$$\text{aggregate bit throughput product} = \sum_{i=1}^{n} A\_i \times B\_i \quad \text{Expression (2)}.$$

In the step B-6, the metrics calculator 318 is further configured to calculate an estimated throughput of the subscriber in the data network over the predetermined monitoring period, by dividing the aggregate bit throughput by the aggregate number of bits received corresponding to the subscriber, according to an Expression (3):

$$\text{estimated throughput} = \frac{\sum_{i=1}^{n} A\_i * B\_i}{\sum_{i=1}^{n} A\_i} \quad \text{expression (3)}$$

In the present second exemplary embodiment, for example, the two or more traffic flows comprise at least one uplink traffic flow. In another example, the two or more traffic flows comprises at least one downlink traffic flow.

In an embodiment altered from the first exemplary embodiment, at the step B-6, the metrics output 319 of the probe 100 is further configured to output the estimated throughput of the subscriber over the predetermined monitoring period to an external data analysis processing device or the CEM 150.

By executing the methods for calculating throughput of a subscriber in a data network shown in preceding exemplary embodiments for various communication networks, throughput of subscriber can be efficiently and effectively calculated closer to the user-perspective throughput.

The preceding exemplary embodiments of the present invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or in connection with an instruction execution system, apparatus, or device, such as a network monitoring device shown in FIGS. 5 to 8. A computer-readable medium may include a computer-readable storage medium (e.g., a physical device) that may be any media or means that can carry or store the instructions for use by or in connection with a system, apparatus, or device, such as a computer or a communication device. For instance, the storage unit 132 may include the computer-readable medium which may include computer program code, when executed by the processor unit 131, may cause the network monitoring device and related methods/approaches to estimate user-perceived throughput in the communication network or the data network by calculating weighted average of measured average throughput of traffic flows corresponding to the same subscriber over preconfigured monitoring period to perform procedures/steps illustrated in FIGS. 9 and 10.

Further aspects of the network monitoring probe 100 will be apparent from the above description of the network monitoring probe 100. Persons skilled in the art will also appreciate that any of the methods described above could be embodied in program code. The program code could be supplied in a number of ways, for example on a tangible computer readable medium, such as a disc or a memory or as a data signal.

It is to be understood that if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method for calculating throughput of a subscriber in a data network, comprising:

monitoring, by a network monitoring device, two or more traffic flows in a 4G communication network corresponding to the subscriber over a predetermined monitoring period, wherein the network monitoring device sniffs the two or more traffic flows from each of a S1-U interface, a S1-MME interface, a S6a interface, and a S11 interface in the 4G communication network, wherein the two or more traffic flows include each of a unidirectional traffic flow, a bidirectional traffic flow, and an application traffic flow, wherein the bidirectional traffic flow corresponds to two directional traffic flows having opposite directions, and wherein the application traffic flow is an aggregation of multiple bidirectional traffic flows, wherein a statistical data of the bidirectional traffic flow is reported in a pre-configured data structure including an upper IP address, a lower IP address, an upper port number, a lower port number, an application ID, a downlink statistic data structure and an uplink statistic data structure, wherein the downlink statistic data structure at least include number of bytes and number of packets received from a downlink traffic flow of the bidirectional traffic flow, an 'Active Second Vector' configured to record a plurality of active seconds of downlink traffic flow within a current reporting period and a 'Period Octet Vector' configured to accumulate and store statistical data of the downlink traffic flow within the current reporting period, wherein the uplink statistic data structure at least include number of bytes and number of packets received from an uplink traffic flow of the bidirectional traffic flow, an 'Active Second Vector' configured to record a plurality of active seconds of uplink traffic flow within the current reporting period and a 'Period Octet Vector' configured to accumulate and store statistical data of the uplink traffic flow within the current reporting period;

calculating, by the network monitoring device, a total number of bits in each of the two or more traffic flows over the predetermined monitoring period;

calculating, by the network monitoring device, an average throughput of each of the two or more traffic flows over the predetermined monitoring period; and calculating, by the network monitoring device, a weighted average of the average throughput of each of the two or more traffic flows based on the total number of bits in each of the two or more traffic flows, wherein the weighted average provides an estimated throughput of the subscriber in the data network over the predetermined monitoring period, wherein the weighted average of the average throughput of each of the two or more traffic flows based on the total number of bits in each of the two or more traffic flows is calculated by
  summing, by the network monitoring device, the calculated total number of bits in each of the two or more traffic flows over the predetermined monitoring period to generate an aggregate number of bits corresponding to the subscriber;
  multiplying, by the network monitoring device, the average throughput of each of the two or more traffic flows over the predetermined monitoring period with a corresponding total number of bits in the traffic flow to generate two or more bit throughput products corresponding to the two or more traffic flows;
  summing, by the network monitoring device, the two or more bit throughput products to generate an aggregate bit throughput product; and
  dividing, by the network monitoring device, the aggregate bit throughput product by the aggregate number of bits so as to generate an estimated throughput of the subscriber in the data network.

2. The method of claim 1, wherein the weight of the average throughput of one of the two or more traffic flows is proportional to the calculated total number of bits of the traffic flow over the predetermined monitoring period.

3. The method of claim 1, wherein the two or more traffic flows comprise at least one uplink traffic flow.

4. The method of claim 1, wherein the two or more traffic flows comprise at least one downlink traffic flow.

5. The method of claim 1, wherein calculating the total number of bits in each of the two or more traffic flows comprise calculating the total number of bits in application protocol data units carried by each of the two or more traffic flows.

6. The method of claim 1, wherein calculating the average throughput of each of the two or more traffic flows comprise calculating the average throughput of application protocol data units carried by each of the two or more traffic flows.

7. The method of claim 1, further comprising outputting, by the network monitoring device, the estimated throughput of the subscriber over the predetermined monitoring period to an external data analysis processing device.

8. The method of claim 1, wherein the network monitoring device is connected to the S1-U interface between an eNB and a S-GW/SGSN, further to the S1-MME interface between the eNB and a MME, further to the S6a interface between a HSS and the MME, and further to the S11 interface between the MME and the S-GW/SGSN.

9. A method for calculating throughput of a subscriber in a data network, comprising: monitoring, by a network monitoring device, two or more traffic flows in a 4G communication network corresponding to the subscriber over a predetermined monitoring period, wherein the network monitoring device sniffs the two or more traffic flows from each of a S1-U interface, a S1-MME interface, a S6a interface, and a S11 interface in the 4G communication network, wherein the two or more traffic flows include each of a unidirectional traffic flow, a bidirectional traffic flow, and an application traffic flow, wherein the bidirectional traffic flow corresponds to two directional traffic flows having opposite directions, and wherein the application traffic flow is an aggregation of multiple bidirectional traffic flows, wherein a statistical data of the bidirectional traffic flow is reported in a pre-configured data structure including an upper IP address, a lower IP address, an upper port number, a lower port number, an application ID, a downlink statistic data structure and an uplink statistic data structure, wherein the downlink statistic data structure at least include number of bytes and number of packets received from a downlink traffic flow of the bidirectional traffic flow, an 'Active Second Vector' configured to record a plurality of active seconds of downlink traffic flow within a current reporting period and a 'Period Octet Vector' configured to accumulate and store statistical data of the downlink traffic flow within the current reporting period, wherein the uplink statistic data structure at least include number of bytes and number of packets received from an uplink traffic flow of the bidirectional traffic flow, an 'Active Second Vector' configured to record a plurality of active seconds of uplink traffic flow within the current reporting period and a 'Period Octet Vector' configured to accumulate and store statistical data of the uplink traffic flow within the current reporting period;

calculating, by the network monitoring device, a total number of bits in each of the two or more traffic flows over the predetermined monitoring period so as to generate A_i, wherein an index i is a positive integer;

calculating, by the network monitoring device, an average throughput of each of the two or more traffic flows over the predetermined monitoring period to be B_i;

calculating, by a network monitoring device, an aggregate number of bits corresponding to the subscriber according to expression (1):

aggregate number of bits=$\Sigma_{i=1}^{n} A\_i$   expression (1), wherein the parameter n is the number of traffic flows corresponding to the subscriber over the predetermined monitoring period;

calculating, by a network monitoring device, an aggregate bit throughput product corresponding to the subscriber according to expression (2):

aggregate bit throughput product=$\Sigma_{i=1}^{n} A\_i * B\_i$   expression (2); and calculating, by a network monitoring device, an estimated throughput of the subscriber over the predetermined monitoring period according to expression (3):

$$\text{estimated throughput} = \frac{\sum_{i=1}^{n} A\_i * B\_i}{\sum_{i=1}^{n} A\_i}.$$   expression (3)

10. The method of claim 9, wherein the two or more traffic flows comprise at least one uplink traffic flow.

11. The method of claim 9, wherein the two or more traffic flows comprise at least one downlink traffic flow.

12. The method of claim 9, wherein the network monitoring device is connected to the S1-U interface between an eNB and a S-GW/SGSN, further to the S1-MME interface between the eNB and a MME, further to the S6a interface between a HSS and the MME, and further to the S11 interface between the MME and the S-GW/SGSN.

13. A network monitoring device for calculating throughput of a subscriber in a data network comprising:

a datagram monitor, configured to:

monitor two or more traffic flows in a 4G communication network corresponding to the subscriber over a predetermined monitoring period, wherein the network monitoring device sniffs the two or more traffic flows from each of a S1-U interface, a S1-MME interface, a S6a interface, and a S11 interface in the 4G communication network, wherein the two or more traffic flows include each of a unidirectional traffic flow, a bidirectional traffic flow, and an application traffic flow, wherein the bidirectional traffic flow corresponds to two directional traffic flows having opposite directions, and wherein the application traffic flow is an aggregation of multiple bidirectional traffic flows, wherein a statistical data of the bidirectional traffic flow is reported in a pre-configured data structure including an upper IP address, a lower IP address, an upper port number, a lower port number, an application ID, a downlink statistic data structure and an uplink statistic data structure, wherein the downlink statistic data structure at least include number of bytes and number of packets received from a downlink traffic flow of the bidirectional traffic flow, an 'Active Second Vector' configured to record a plurality of active seconds of downlink traffic flow within a current reporting period and a 'Period Octet Vector' configured to accumulate and store statistical data of the downlink traffic flow within the current reporting period, wherein the uplink statistic data structure at least include number of bytes and number of packets received from an uplink traffic flow of the bidirectional traffic flow, an 'Active Second Vector' configured to record a plurality of active seconds of uplink traffic flow within the current reporting period and a 'Period Octet Vector' configured to accumulate and store statistical data of the uplink traffic flow within the current reporting period; and a metrics calculator, connected to the datagram monitor and configured to:

calculate a total number of bits in each of the two or more traffic flows over the predetermined monitoring period;

calculate an average throughput of each of the two or more traffic flows over the predetermined monitoring period; and calculate a weighted average of the average throughput of each of the two or more traffic flows based on the total number of bits in each of the two or more traffic flows, wherein the weighted average provides an estimated throughput of the subscriber in the data network over the predetermined monitoring period, wherein the metrics calculator calculates the weighted average of the average throughput of each of the two or more traffic flows based on the total number of bits in each of the two or more traffic flows by summing, by the network monitoring device, the calculated total number of bits in each of the two or more traffic flows over the predetermined monitoring period to generate an aggregate number of bits corresponding to the subscriber;

multiplying, by the network monitoring device, the average throughput of each of the two or more traffic flows over the predetermined monitoring period with a corresponding total number of bits in the traffic flow to generate two or more bit throughput products corresponding to the two or more traffic flows;

summing, by the network monitoring device, the two or more bit throughput products to generate an aggregate bit throughput product; and dividing, by the network monitoring device, the aggregate bit throughput product by the aggregate number of bits so as to generate an estimated throughput of the subscriber in the data network.

14. The network monitoring device of claim 13, wherein the weight of the average throughput of one of the two or more traffic flows is proportional to the calculated total number of bits of the traffic flow over the predetermined monitoring period.

15. The network monitoring device of claim 13, wherein the two or more traffic flows comprise at least one uplink traffic flow.

16. The network monitoring device of claim 13, wherein the two or more traffic flows comprise at least one downlink traffic flow.

17. The network monitoring device of claim 13, further comprising: a metrics output connected to the metrics calculator and configured to output the estimated throughput of the subscriber over the predetermined monitoring period to an external data analysis processing device.

18. The network monitoring device of claim 13, wherein the network monitoring device is connected to the S1-U interface between an eNB and a S-GW/SGSN, further to the S1-MME interface between the eNB and a MME, further to the S6a interface between a HSS and the MME, and further to the S11 interface between the MME and the S-GW/SGSN.

19. A network monitoring device for calculating throughput of a subscriber in a data network, comprising:

a datagram monitor, configured to: monitor two or more traffic flows in a 4G communication network corresponding to the subscriber over a predetermined monitoring period, wherein the network monitoring device sniffs the two or more traffic flows from each of a S1-U interface, a S1-MME interface, a S6a interface, and a S11 interface in the 4G communication network, wherein the two or more traffic flows include each of a unidirectional traffic flow, a bidirectional traffic flow, and an application traffic flow, wherein the bidirectional traffic flow corresponds to two directional traffic flows having opposite directions, and wherein the application traffic flow is an aggregation of multiple bidirectional traffic flows, wherein a statistical data of the bidirectional traffic flow is reported in a pre-configured data structure including an upper IP address, a lower IP address, an upper port number, a lower port number, an application ID, a downlink statistic data structure and an uplink statistic data structure, wherein the downlink statistic data structure at least include number of bytes and number of packets received from a downlink traffic flow of the bidirectional traffic flow, an 'Active Second Vector' configured to record a plurality of active seconds of downlink traffic flow within a current reporting period and a 'Period Octet Vector' configured to accumulate and store statistical data of the downlink traffic flow within the current reporting period, wherein the uplink statistic data structure at least include number of bytes and number of packets received from an uplink traffic flow of the bidirectional traffic flow, an 'Active Second Vector' configured to record a plurality of active seconds of uplink traffic flow within the current reporting period and a 'Period Octet Vector' configured to accumulate and store statistical data of the uplink traffic flow within the current reporting period; and a metrics calculator, connected to the datagram monitor and configured to:

calculate a total number of bits in each of the two or more traffic flows over the predetermined monitoring period so as to generate A_i, wherein an index i is a positive integer;

calculate an average throughput of each of the two or more traffic flows over the predetermined monitoring period to be B_i;

calculate an aggregate number of bits corresponding to the subscriber according to Expression (1):

$$\text{aggregate number of bits} = \Sigma_{i=1}^{n} A\_i \qquad \text{expression (1)},$$

wherein the parameter n is the number of traffic flows corresponding to the subscriber over the predetermined monitoring period;

calculate an aggregate bit throughput product corresponding to the subscriber according to Expression (2):

$$\text{aggregate bit throughput product} = \Sigma_{i=1}^{n} A\_i * B\_i \quad \text{expression (2); and}$$

calculate an estimated throughput of the subscriber over the predetermined monitoring period according to Expression (3):

$$\text{estimated throughput} = \frac{\sum_{i=1}^{n} A\_i * B\_i}{\sum_{i=1}^{n} A\_i}. \qquad \text{Expression (3)}$$

20. The network monitoring device of claim 18, further comprising: a metrics output connected to the metrics calculator and configured to output the estimated throughput of the subscriber in the data network over the predetermined monitoring period to an external data analysis processing device.

21. The network monitoring device of claim 19, wherein the network monitoring device is connected to the S1-U interface between an eNB and a S-GW/SGSN, further to the S1-MME interface between the eNB and a MME, further to the S6a interface between a HSS and the MME, and further to the S11 interface between the MME and the S-GW/SGSN.

* * * * *